Oct. 29, 1963  F. DECKERT  3,108,836
FRAME CONSTRUCTION FOR VEHICLES
Filed Aug. 17, 1960  2 Sheets-Sheet 1
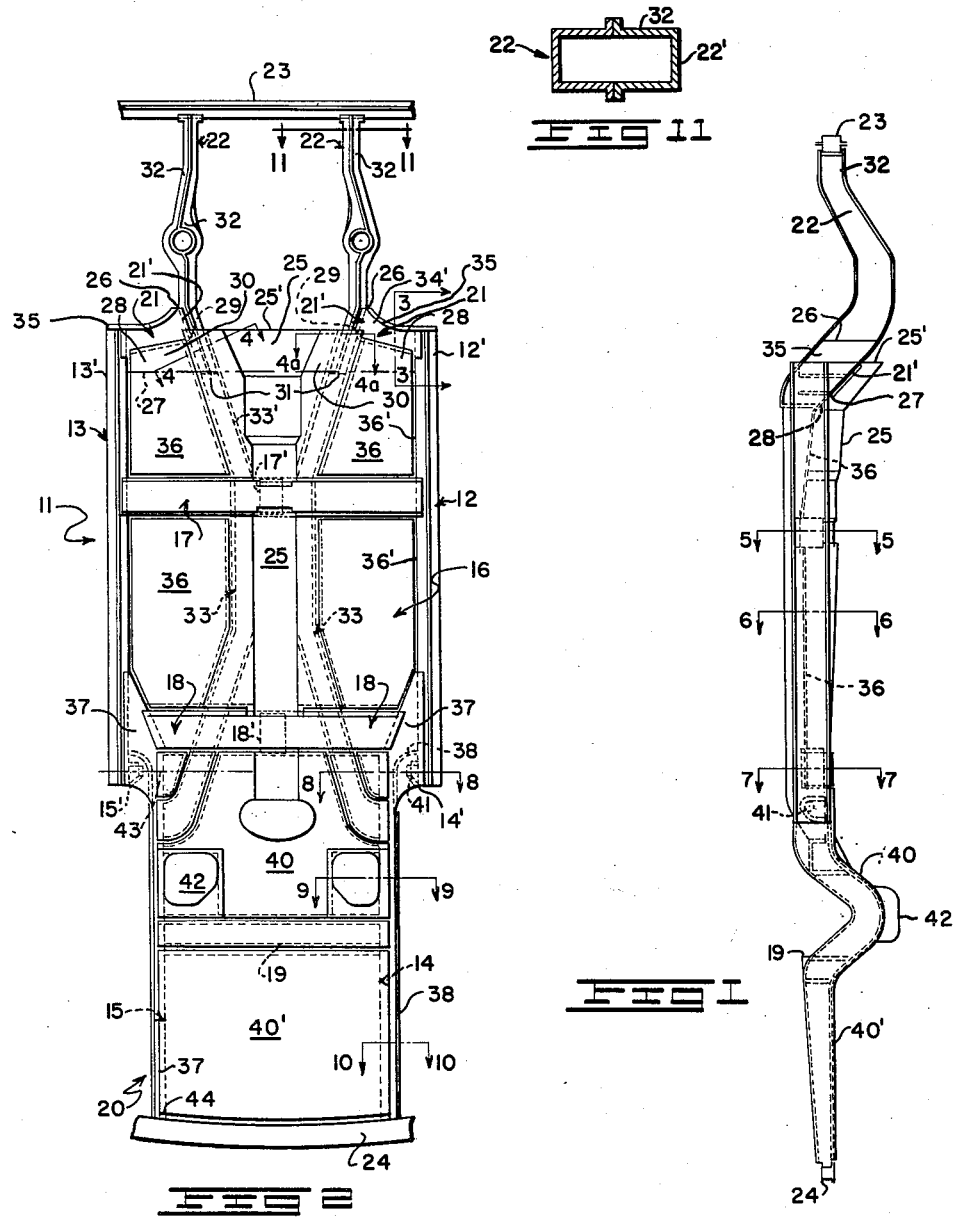
INVENTOR
FRANZ DECKERT
BY *Dicke, Craig & Freudenberg*
ATTORNEYS

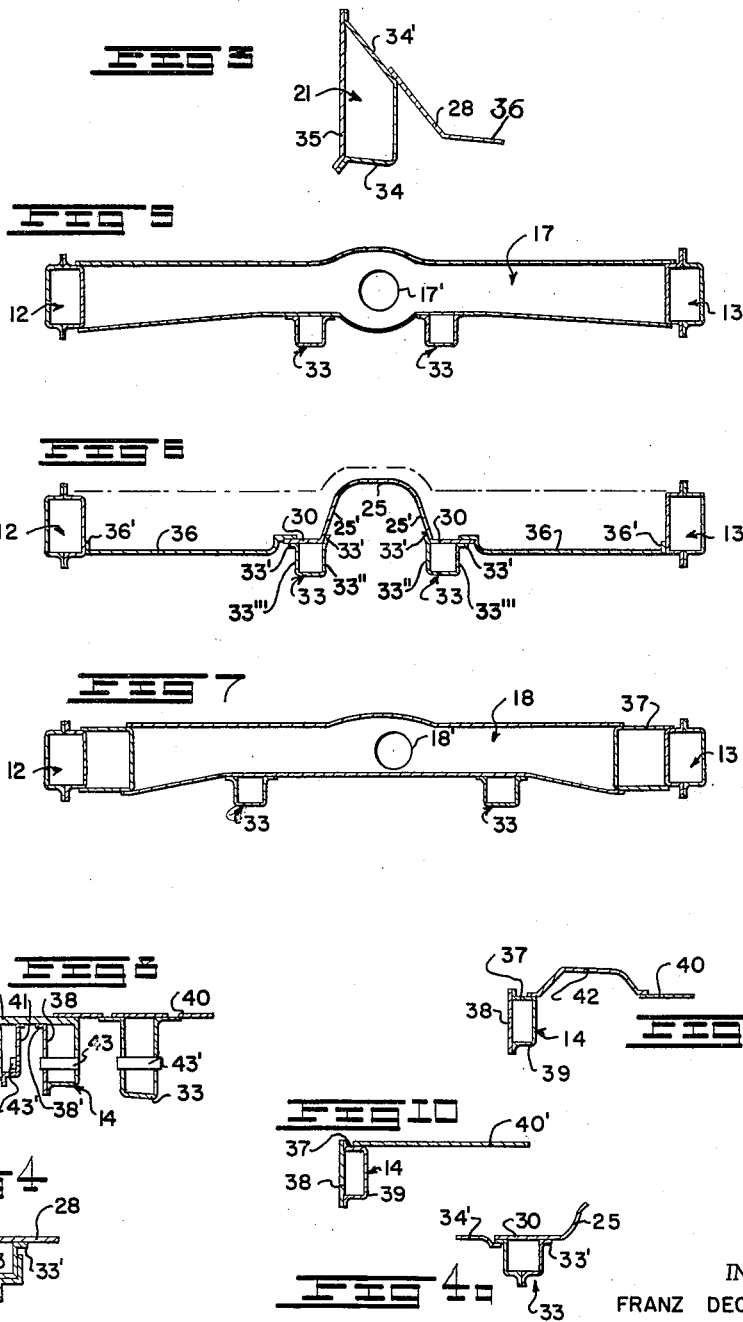

United States Patent Office 3,108,836
Patented Oct. 29, 1963

3,108,836
FRAME CONSTRUCTION FOR VEHICLES
Franz Deckert, Sindelfingen Kreis, Boeblingen, Germany, assignor to Daimler-Benz Aktiengesellschaft, Stuttgart-Unterturkheim, Germany
Filed Aug. 17, 1960, Ser. No. 50,133
Claims priority, application Germany Aug. 28, 1959
6 Claims. (Cl. 296—28)

The present invention relates to a frame floor construction for vehicles, especially for motor vehicles provided with a center tunnel arranged in the main part thereof, with inner longitudinal bearer members extending in a fork-shaped manner toward the forward and rearward longitudinal bearer members, and with cross bearer members which are rigidly connected with the outer main longitudinal bearer members constituting the main frame.

The present invention aims at a stable, unitary and common underchassis structure for either closed or open vehicle bodies, i.e., sedan-type or convertible-type bodies of larger and relatively spacious passenger vehicles, especially for those having swinging half-axles.

In the known chassis-floor constructions of the prior art, the bending and twisting forces that occur in a vehicle are either absorbed by closed center tunnels whereby, in a disadvantageous manner, the lateral stability is not considered or the main longitudinal bearer members which may also be provided with cross bearer members and which are bent into an X-shaped sub-frame as well as constructed in the center thereof with interconnecting web portions, serve for purposes of achieving the required bending and twisting or torsional rigidity whereas the vehicle floor emplaced thereupon is provided with a center tunnel opened toward the bottom thereof which then serves exclusively for covering purposes and not for purposes of absorbing any such forces.

Vehicle frames or chassis are also known in the prior art which are provided with a hollow torsion box-type member extending transversely to the vehicle approximately in the center thereof for purposes of increasing the torsional rigidity over which passes, within this region, a doubly covered center tunnel. With this latter type of vehicle frame which possesses a rather significant weight, the torsional moments are absorbed by the center box-type member as a whole and the frontal forces are introduced approximately rectilinearly into the longitudinal lateral longitudinal bearer members which have an open profile in cross section outside the box-type member.

The present invention is concerned with the task of eliminating the aforementioned disadvantages and shortcomings of the prior art and essentially consists in the fact that the inner longitudinal bearer members form an X-shaped center frame together with the center tunnel which is open at the bottom over the entire length thereof.

By reason of the connection of the center tunnel with the inner longitudinal bearer members which extend in a continuous manner approximately up to the rear axle of the vehicle, the center tunnel is adapted to absorb bending and twisting forces whereas the vehicle rear end which has a relatively large length is reliably supported by the rear frame consisting of the rear cross and longitudinal bearer members by the securing of the rear longitudinal bearer members, considerably in front of the rear end of the main longitudinal bearer members as well as at the rear ends of the inner longitudinal bearer members.

The floor frame or chassis according to the present invention is of particular applicability to vehicles with swinging half-axles. However, in lieu of the underframe or chassis of a passenger motor vehicle provided with swinging half-axles, as described and illustrated hereinafter, the present invention is also suitable for vehicles with rigid axles. In that case, the cross bearer members which are closed at the bottom thereof of the vehicle main part have to be extended above the tunnel aperture.

Accordingly, it is a principal object of the present invention to provide a floor frame or chassis construction for vehicles, especially for spacious passenger motor vehicles which avoids the inadequacies and shortcomings of the prior art construction in a simple and reliable manner.

It is another object of the present invention to provide a floor underframe construction in which the center tunnel is so connected with other parts of the frame as to readily lend itself to aiding in the absorption of bending and torsional forces and stresses that might occur in the vehicle frame.

Still another object of the present invention resides in the provision of a frame for vehicles which has favorable characteristics insofar as the absorption of bending and torsional stresses is concerned, which is of relative light weight, and which assures sufficient lateral stability.

Still another object of the present invention resides in the provision of a floor frame construction for motor vehicles in which the center tunnel need not be constructed as a fully closed box-type bearer member notwithstanding its inclusion in the frame construction as a force absorbing member.

A further object of the present invention resides in the provision of a floor underframe arrangement for motor vehicles in which relatively short inner longitudinal bearer members are so connected with the center tunnel and the remainder of the frame as to impart to the frame construction an X-type configuration lending thereto a rigidity unobtainable heretofore with similar constructions.

These and further objects, features and advantages of the present invention will become more obvious from the following description when taken in connection with the accompanying drawing, which shows, for purposes of illustration only, one embodiment in accordance with the present invention, and wherein:

FIGURE 1 is a lateral elevational view of a floor frame construction in accordance with the present invention;

FIGURE 2 is a top plan view of the floor frame construction of FIGURE 1;

FIGURE 3 is a cross-sectional view, on an enlarged scale, taken along line 3—3 of FIGURE 2; and FIGURES 4 through 11 are cross-sectional views, on an enlarged scale, taken along lines 4—4 through 11—11 of FIGURES 1 and 2.

Referring now to the drawing, wherein like reference numerals are used throughout the various views to designate like parts, and more particularly to FIGURES 1 and 2 thereof, reference numeral 11 generally designates the floor frame construction in accordance with the present invention which is usable with relatively large vehicle bodies of motor vehicles. The floor frame construction 11 of the present invention essentially consists of an outer bearing means formed by two lateral longitudinal main bearer members generally designated by reference numerals 12 and 13 and two rear longitudinal bearer members generally designated by reference numerals 14 and 15 of box-shaped cross section which extend at about the same distance relative to each other. The main part of the floor frame 11 is generally designated in FIGURE 2 by reference numeral 16. Two main cross bearer members generally designated by reference numerals 17 and 18 and of box-shaped cross section are secured to the inner sides of the longitudinal bearer members 12 and 13 within the main part 16 of the frame which also occupy the same distance relative to each other. A further rear cross bearer member 19 is secured along the inner sides of the rear bearer members 14 and 15 within the rear portion of the frame generally designated by reference numeral 20 which cross bearer member 19 is also of box-shaped cross section and extends essentially parallel to the transverse members 17 and 18. All the bearer members 12 through 19 are also connected with each other by the vehicle body floor.

The forward ends 12' and 13' of the lateral main longitudinal bearer members 12 and 13, respectively, are delimited by one intermediate bearer member each generally designated by reference numeral 21, which are also of box-shaped cross section and extend inwardly toward each other. Each of the intermediate bearer members 21 rigidly connects a respective forward longitudinal bearer member generally designated by reference numeral 22 with one of the main longitudinal bearer members 12 and 13. Each forward longitudinal bearer member 22 is constructed as a hollow box-type member and the members 22 are placed in front of the frame main part 16 in a fork-like manner.

The forward longitudinal bearer members 22 are limited in front thereof by means of a further forward cross bearer member 23 of hollow box-shaped cross section whereas the rear longitudinal bearer members 14 and 15 terminate at the rear thereof in a box-shaped transverse end bearer member 24 and therewith close the floor frame 11 toward the rear thereof.

The forward longitudinal bearer members 22 which are formed by two hat-shaped profile bearer members (FIGURE 11) which have the open sides thereof placed upright against each other and which are offset or bent upwardly within the region of the front axle, extend inwardly from the connecting place 26 thereof with a respective intermediate bearer member 21 approximately up to the height of the rear edge 27 (FIGURE 1) of the pedal-floor 28, almost up to the offset or upwardly bent aperture 25' (FIGURES 1 and 2) of the center tunnel 25, whereas the inwardly projecting end flange 21' (FIGURE 2) of each intermediate bearer member 21 is secured to the upper horizontal web portion 32 (FIGURE 2) of the outer hat-shaped profile member of each forward longitudinal bearer member 22.

Each forward longitudinal bearer member 22 has a different cross section in the rear part thereof, i.e., changes its cross section approximately from the point of the forward tunnel aperture 25', and from that point extends as an inner longitudinal bearer member generally designated by reference numeral 33 along the tunnel 25 up to a point rearward of the first main cross bearer member 17. The inner longitudinal bearer members 33 extend obliquely outwardly approximately from a point located in the middle between the main cross bearer members 17 and 18 in the direction toward the two lateral main longitudinal bear members 12 and 13, and, to the rear of the main cross bearer member 18, are bent to extend approximately at right angles to the rear longitudinal bearer members 14 and 15, respectively. The outer rear ends of the inner longitudinal bearer members 33 are rigidly connected with the rear longitudinal bearer members 14 and 15 in any suitable manner. The bending and twisting forces are thereby reliably absorbed by such an arrangement of the inner longitudinal bearer members 33 within the vehicle center by means of the center tunnel 25 which is essentially open toward the bottom thereof.

The offset or upwardly bent aperture 25' of the center tunnel 25 is disposed approximately in a vertical plane containing the forward ends 12' and 13' of the main longitudinal bearer 12 and 13 in order to absorb or pass on all frontal forces and stresses by means of the rigid and safely reinforced forward portion of the main frame part 16. For that purpose, the flange 30 (FIGURE 4a), which extends from the tunnel walls 25 over the rear end 29 (FIGURES 1 and 2) of the leg portion 34' of each intermediate bearer member 21 and which is bent off from the tunnel side wall 25, is welded as sheet metal cover for the rear end 31 (FIGURES 1 and 2), directed toward the vehicle center, of each forward longitudinal bearer member 22 so as to form a rigid connection therewith.

The upwardly disposed web portions 32 (FIGURE 1) of the two hat-shaped longitudinal bearer members 22 (FIGURES 1 through 3 and 11) are thereby dispensed with. Mutually opposite, outwardly bent flanges 33' (FIGURE 4) are thereby provided in the place of the two side covers of the longitudinal bearer members 22 (FIGURE 4) which flanges 33' extend outwardly from the web portions of the inner longitudinal bearer members 33, themselves continuing in essentially the same direction.

The two intermediate bearer members 21 of hollow box-shaped construction consist essentially of a U-shaped bearer member 34 (FIGURE 3), the forwardly exposed aperture of which is closed off by the vertical lateral sheet metal member 35 and the one leg portion 34' of which follows the inclination of the pedal floor 28. The pedal floor 28 is welded with the forward end thereof to the inclined upward bearer leg portion 34' (FIGURE 3), and also overlaps with the lateral flange 30 of the tunnel wall 25 (FIGURE 6). The rear end 31 (FIGURE 2) of each forward longitudinal bearer member 22 is closed off toward the top thereof by a rigid connection of the mutually oppositely directed flanges 33' with the lateral sheet-metal flange 30 of the center tunnel wall 25 whereby the lateral rim of the inclined leg portion 34' of each of the intermediate bearer members 21 (FIGURE 4a) extends below these flanges 33'.

The floor sheet-metal member 36 of the main part 16 of the frame which adjoins the pedal floor 28, extends from the plane of the pedal floor 28 approximately horizontally and is reinforced by means of grooves (not illustrated) extending at least in part into the pedal floor 28. The floor assembly 28, 16 establishes, by means of flanges 36' (FIGURE 6), the rigid connection between the lateral main bearer members 12 and 13 and the inner bearer members 21, 33 as well as with the center tunnel 25. The center tunnel 25 is supported at the bottom thereof by the inner longitudinal bearer members 33, which extend rearwardly below the flanges 30 (FIGURE 6) of the tunnel side walls 25, and by the lower cover walls of the main cross bearer members 17 and 18 of the main frame part 16 which are composed of two profile bearer members of hat-shaped cross section.

The two main cross bearer members 17 and 18 are arched in the center part thereof partly upwardly and partly downwardly and are provided with an approximately central, relatively large aperture 17' and 18' for purposes of extending therethrough the Cardan shaft (not shown).

In vehicle bodies for vehicles provided with rigid axles, the main cross members 17 and 18 may also be open toward the bottom thereof. The upper edges then are of a configuration above the center tunnel 25 approximately as shown in the dot and dash lines in FIGURE 6.

The inwardly disposed flange 33' of each inner longitudinal bearer member 33 is bent upwardly (FIGURE 6) along the inside of the center tunnel wall 25 from a point to the rear of the main cross bearer member 17 up to the point where the inner longitudinal bearer members 33 extend away from the center tunnel 25 in front of the rear seat cross bearer member 18.

The inner longitudinal bearer members 33, which are formed by hat-shaped sections that are open at the top extend through the center portion of their length parallel to the center duct 25, and the space which is formed by the lateral parts 33" (see FIGURE 6) of the two inner longitudinal bearer members 33 which extend upwardly is bridged over by the wide, flange-like rims 30 on the sides 25' of the center duct 25. The horizontally extending rims 30 support the duct 25 at the sides 33" and 33'" of the inner longitudinal bearer members 33 and at the bent flanges 33' of the last-mentioned bearer means, the rims 30 being rigidly connected therewith.

With vehicles having a rigid axle, the center tunnel 25 is to be constructed open toward the bottom thereof over the entire length of the Cardan shaft (not illustrated). For that purpose, the main cross bearer members 17 and 18 are extended over the center tunnel 25, as illustrated in dot and dash line in FIGURE 6, so that the center tunnel 25 may remain open at the bottom thereof also within the region of the main cross bearer members 17 and 18.

Still ahead of the rear main cross bearer member 18, the two inner longitudinal bearer members 33 branch off or diverge in a fork-shaped manner from the tunnel side walls 25 toward the vehicle outside in order to support additionally the rear main cross bearer member 18 approximately at the same distance from the tunnel wall and from the forward ends 14' and 15' of the rear longitudinal bearer members 14 and 15 which extend rearwardly with the usual off-set for the rear axle at a somewhat lesser distance than the main bearer members 12 and 13. The inner longitudinal bearer members 33 are bent outwardly between the rear main cross bearer member 18 and the rear-end cross bearer member 19, approximately at the height of the rear end of the main longitudinal bearer members 12 and 13. The inner longitudinal bearer members 33 are thereby rigidly connected along the angularly bent frontal end portions thereof with the rear longitudinal bearer members 14 and 15 whereby the two flanges 33' are each secured to the web portions 37 in the profile bearer sections 39 (FIGURES 9 and 10) of the two longitudinal bearer members 14 and 15 which carry the rear floor 40. These connecting places of the bearer members 33 and of the bearer members 14 and 15 form the forward receiving point for the rear axle gear or rear axle auxiliary frame unit (not illustrated).

The rear longitudinal bearer members 14 and 15 are formed by a profile bearer member 39 (FIGURES 9 and 10) of hat-shaped cross section which is closed off toward the outside thereof by means of approximately vertical sheet-metal cover members or plate members 38. The upper web portions 37 (FIGURE 8) of the profile bearer sections 39 are widened within the forward bearer region 14' and 15' of the longitudinal bearer members 14 and 15 up to the inner hat-shaped cross section of the main longitudinal bearer members 12 and 13 to which they are secured in any suitable manner. The sheet metal cover member 38 which covers the outer sides of the hat-shaped longitudinal bearer members 14 and 15 over the largest region thereof as shown in FIGURES 9 and 10 is provided within the area of the connection between the angularly-bent ends of the inner longitudinal bearer members 33 and the forward ends of the rear longitudinal bearer members 14 and 15 with a flange 38' directed toward the rear portions of the main longitudinal bearer members 12 and 13. The flange 38' is secured at the upper web portion 37 of the forward part of each rear longitudinal bearer member 14 and 15 whereby this web portion 37 is rigidly connected with the inner part of the respective main longitudinal bearer members 12 and 13. The forward ends of the rear longitudinal bearer members 14 and 15, in the forwardly extending portions thereof, are enlarged or expanded forwardly obliquely so that a relatively large abutment surface results therefrom at the lateral main longitudinal bearer members 12 and 13 which exceeds considerably the width of the rear main cross bearer member 18.

The outwardly bent upper flange 38' at the sheet-metal cover member 38 of the hat-shaped rear profile bearer section 39 which is disposed approximately in front of the rigid connection of the inner longitudinal bearer members 33, extended downwardly in the rear part 20 of the vehicle, at the rear longitudinal bearer members 14 and 15, supports or reinforces the enlarged web portion 37 (FIGURE 8) which is widened outwardly within the forward region of the rear bearer members 14' and 15'. Intermediate the rear end of the main longitudinal bearer members 12 and 13 and the rear longitudinal bearer 14, a sheet-metal profile member 41 (FIGURE 8) which is provided with a bore and with a bent-up rim edge surrounding the same, is secured in any suitable manner at the inwardly disposed cover wall of each longitudinal main bearer member 12 and 13 as bearing support 43 for the accommodation of the rear axle (not illustrated). The inner longitudinal bearer members 33 and the longitudinal rear bearer members 14 and 15 are provided in the plane of the bearing places with apertures 43' to enable extending therethrough, for example, drive shafts or the like. By reason of the double securing places, effective as lever arm, of the rear longitudinal bearer members 14 and 15 at the inner longitudinal bearer members 33, as well as at the main longitudinal bearer members 12 and 13, a reliable and safe support of the longitudinal bearer members 14 and 15 is assured.

A truncated, pyramidically shaped support bracket 42 (FIGURES 1, 2 and 9) is flangedly connected securely at the offset or upwardly bent rear floor 40 in front of the rear cross bearer member 19, and more particularly at a lateral end and at the web portion 37 as well as at the rear end laterally recessed rim of the upwardly bent rear floor 40, for purposes of accommodating pneumatic spring elements (not illustrated).

The rear floor portion 40' which forms the bottom of the floor for the luggage space rests rigidly on the inwardly-directed flanges of the rear ends of the longitudinal bearer members 14 and 15, as well as of the rear cross bearer member 19. The rear floor 40' which may be constructed not only in a flat, but tub-shaped manner, is limited at the rear thereof by the rear cross bearer member 24.

By reason of the securing of the pedal floor 28 and of the floor sheet metal members 36, 40 and 40', and especially by reason of the mutually rigid connection and support of the longitudinal and cross bearer members as well as of the connecting bearer members with each other and at one another, the frame floor assembly in accordance with the present invention is constructed to be rigid against bending and twisting forces, and offers, for purposes of absorbing in a favorable manner heavy impacts and loading moments, an underframe or chassis for a large motor vehicle equipped to satisfy high demands.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A floor frame arrangement for motor vehicles having a sheet metal center duct means, said duct means being open at the bottom throughout the entire length thereof, a pair of longitudinally extending inner bearer members, said inner bearer members being arranged within the center portion of the frame in approximately an X-shape, a pair of longitudinally and laterally extending outer bearer members forming the main frame for said vehicle, transverse bearer means connecting said outer bearer members with the other frame components, each of said inner bearer members having a hat-shaped cross section which is open at the top including two upstanding side members, the inner one of said side members of each inner bearer member having a bent flange, the two bent flanges for said pair of inner bearer members extending toward each other and toward the middle of the floor frame, said inner bearer members extending parallel to said center duct means over the central portion of their length, said sheet metal center duct means bridging the space formed between the said one side members of said inner bearer members, each side of said sheet metal duct means being provided with a wide, essentially horizontal, flange-like bent rim, said duct means being supported by said horizontally extending rims on said side members of the inner bearer members, said bent flanges of said inner bearer members being rigidly connected with said rims of the duct means within the center region of said inner longitudinal bearer members, a pair of box-shaped longitudinally extending front bearer members, each said front bearer member consisting of two hat-profiled sections secured together and forming a side web, the main frame formed by the outer bearer members being delimited at the front thereof by a pair of intermediate bearer members each having a trapezoidal profile with a single inclined leg, the single inclined leg of a respective intermediate bearer member being rigidly connected with the side web of a respective one of the front bearer members, said front bearer members extending essentially parallel toward the front of the vehicle from said intermediate bearer member being rigidly connected with the side web of a respective one of the front bearer members, said front bearer members extending essentially parallel toward the front of the vehicle from said intermediate bearer members, and further including a pedal base supported upon said inclined legs.

2. A floor frame arrangement according to claim 1, wherein the ends of the front bearer members are bent downward and inward and are fastened within the area of the intermediate bearer members and the pedal base to the forward, outward-bent ends of said inner bearer members while within the region of the main part of the frame, the open hat-profile of the inner bearer members is closed off by components of the frame.

3. A floor frame arrangement according to claim 1, further including a pair of longitudinally extending rear bearer members and wherein said transverse bearer means includes a backseat transverse bearer member, the rear end of each said inner bearer member being bent upwardly and outwardly behind said backseat transverse bearer member and fastened to a respective rear bearer member, the front ends of said rear bearer members extending toward the front of the vehicle beyond the bent ends of said inner bearer members and being rigidly connected with said outer bearer members in front of said backseat transverse bearer member.

4. A floor frame arrangement according to claim 1, wherein a sheet metal member is secured behind said backseat transverse bearer member and in front of the rear fastening of each inner bearer member to a respective rear bearer member between said rear bearer members and said outer bearer members, each of said sheet metal members being provided with a bore having an edge of the rim thereof bent around said bore for accommodating the rear axle.

5. A floor frame arrangement according to claim 4, further including a rear transverse bearer member extending between said rear bearer members behind said backseat transverse bearer member, and a rear base, said rear base being fastened to the rear ends of said inner bearer members, said rear bearer members and said backseat and said rear transverse bearer members.

6. A floor frame arrangement according to claim 4, further including a pair of longitudinally extending rear bearer members and wherein said transverse bearer means includes a backseat transverse bearer member, the rear end of each said inner bearer member being bent upwardly and outwardly behind said backseat transverse bearer member and fastened to a respective rear bearer member, the front ends of said rear bearer members extending toward the front of the vehicle beyond the bent ends of said inner bearer members and being rigidly connected with said outer bearer members in front of said backseat transverse bearer member.

References Cited in the file of this patent

UNITED STATES PATENTS

| | | |
|---|---|---|
| 2,066,019 | Swallow | Dec. 29, 1936 |
| 2,292,646 | McIntosh | Aug. 11, 1942 |
| 2,627,426 | Toncray | Feb. 3, 1953 |
| 2,864,647 | Chesna | Dec. 16, 1958 |
| 2,935,335 | Muller | May 3, 1960 |
| 2,954,998 | Kushler | Oct. 4, 1960 |

FOREIGN PATENTS

| | | |
|---|---|---|
| 549,669 | Great Britain | Dec. 7, 1942 |
| 1,016,563 | France | Aug. 27, 1952 |